(12) United States Patent
Heindl et al.

(10) Patent No.: US 7,413,386 B2
(45) Date of Patent: Aug. 19, 2008

(54) CONTINUOUS CONNECTING PROFILE FOR ATTACHMENT OF SHEET PILES TO SUPPORTING ELEMENTS

(75) Inventors: Richard Heindl, Muich (DE); Georg Wall, Muich (DE); Rob R. Wendt, Brooklyn, NY (US)

(73) Assignee: Pilepro, LLC, Austin, TX (US)

( * ) Notice: Subject to any disclaimer, the term of this patent is extended or adjusted under 35 U.S.C. 154(b) by 136 days.

(21) Appl. No.: 11/113,512

(22) Filed: Apr. 25, 2005

(65) Prior Publication Data

US 2005/0238443 A1    Oct. 27, 2005

(30) Foreign Application Priority Data

Apr. 23, 2004    (DE)    ........................ 10 2004 019 953

(51) Int. Cl.
E02D 5/02    (2006.01)
E02D 17/00    (2006.01)

(52) U.S. Cl. ........................ 405/279; 405/274; 405/285; D8/382; 403/403

(58) Field of Classification Search ................ 405/279, 405/274, 277, 278, 285; D8/382; 403/66, 403/75, 76, 84, 90, 403
See application file for complete search history.

(56) References Cited

U.S. PATENT DOCUMENTS

| | | | | |
|---|---|---|---|---|
| 1,098,077 A * | 5/1914 | Annison | ...................... | 405/279 |
| 1,431,273 A * | 10/1922 | Webb et al. | ................... | 405/279 |
| 1,431,274 A * | 10/1922 | Webb et al. | ................... | 405/279 |
| 1,690,499 A * | 11/1928 | Nolte | ........................... | 405/279 |
| 1,837,787 A * | 12/1931 | Meiser | ....................... | 405/279 |
| 1,851,864 A * | 3/1932 | Nolte | ........................... | 405/279 |
| 1,855,113 A * | 4/1932 | Nolte | ........................... | 405/14 |
| 1,918,886 A * | 7/1933 | James | ........................ | 405/279 |
| 2,104,490 A * | 1/1938 | Kohler et al. | ............... | 405/279 |
| 6,042,306 A * | 3/2000 | Arndts et al. | ............... | 405/279 |
| 6,428,244 B1* | 8/2002 | Wall | ........................... | 405/279 |
| D463,578 S * | 9/2002 | Wall | ........................... | D25/121 |
| D471,083 S * | 3/2003 | Wall | ........................... | D8/382 |
| D471,794 S * | 3/2003 | Wall | ........................... | D8/382 |
| D479,798 S * | 9/2003 | Wall | ........................... | D8/382 |
| D479,983 S * | 9/2003 | Wall | ........................... | D8/382 |
| 2002/0102131 A1 | 8/2002 | Wall | | |

FOREIGN PATENT DOCUMENTS

| | | |
|---|---|---|
| DE | 410707 | 4/1922 |
| DE | 197 11 242 A1 | 3/1997 |
| DE | 198 22 063 A1 | 5/1998 |
| DE | 199 23 492 A1 | 5/1999 |
| DE | 200 17 445 U1 | 10/2000 |
| DE | 201 21 712 U1 | 6/2003 |

* cited by examiner

*Primary Examiner*—Tara L. Mayo
(74) *Attorney, Agent, or Firm*—Milde & Hoffberg, LLP

(57) ABSTRACT

A continuous connecting profile (10) for attachment of sheet piles to supporting elements has a central rib bar (16) that separates from each other two oppositely-placed attachment profiles, each having a jaw, and is a part of both attachment profiles. One of the attachment profiles is configured as a mounting profile for the supporting element, and the other attachment profile is configured as a receiving profile for a lock of an attaching sheet pile.

32 Claims, 5 Drawing Sheets

CONTINUOUS CONNECTING PROFILE FOR ATTACHMENT OF SHEET PILES TO SUPPORTING ELEMENTS

BACKGROUND OF THE INVENTION

The invention has to do with a continuous connecting profile for attachment of sheet piles to supporting elements, particularly to double-T elements, where the connection profile has a central rib bar, which separates two opposing attachment profiles, each having a jaw, and is part of both attachment profiles. The one attachment profile is configured as a mounting profile for the supporting element, and the other attachment profile is configured as a receiving profile for a lock of an attaching sheet pile.

Such connection profiles are, for example, for assembly of combination sheet pile walls, i.e., sheet pile walls made up of a series of supporting elements, between which numerous sheet piles, generally always pairs of sheet piles, are inserted. Such connection profiles are known, for example, from DE 201 21 712 U1, DE 197 11 242 A1, DE 198 22 063 A1, or DE 199 23 492 A1. In some embodiments these connection profiles have a central rib bar which serves as the divider for two opposing attachment profiles, each having a jaw, and forms part of the interior wall of each attachment profile. In the case of the known attachment profile, the one attachment profile is a mounting profile for the supporting element, which, for example, is mounted on a double-T support element and if necessary is compressed with it. The other attachment profile is a receiving profile for a lock of an attaching sheet pile, for example a sheet pile with so-called Larssen locks placed on both longitudinal edges.

A widely propagated and frequently used sheet pile is the Z sheet pile by Hoesch, which has a Z-shaped cross section, having a knob section on one of its longitudinal ends and a claw section on its other longitudinal end. The claw section has a straight claw flange as well as a claw nose on the actual lock, and an opposing claw thumb, both of which act as the ends of a jaw with a jaw opening, into which the knob section (which is roughly trapezoid-shaped in cross section) of an attaching Z sheet pile can be inserted. The claw section and the head section of the Z sheet pile are bent in the lock area, in order to move the lock from the gradient of the sheet pile so that the sheet pile-wall flanges that meet each other form a straight line, and the lock connection of the two sheet piles does not project out from the areas of the sheet pile wall flanges.

By stringing such Z sheet piles together, stable sheet pile walls can be assembled. The geometrical shape of the claw-and-knob section does in fact make possible a relatively small swiveling angle of +/−7° between adjoining sheet piles, through which, when the sheet piles are rammed down, the locks can jump out of their connections if the ground is uneven.

Adjoining support elements can swivel in deviate fashion, for example, when these support elements are rammed beneath the ground, if the ground is very irregular due to rock formations, erratic blocks or similar phenomena, so that the support elements are twisted about their longitudinal axis when rammed down.

Adjoining support elements may, however, be deliberately subjected to deviate twisting, in order, for example, to form a circle or some other closed formation of combination sheet pile wall or sheet pile walls with a projecting corner without additional construction components.

Such Z sheet piles have not been able to be used until now to create combination sheet pile walls from support elements and sheet piles, which, for example, are needed to create harbor facilities. Attachment profiles appropriate to the supporting elements, which permit a secure ramming down of the sheet pile wall, do not exist.

SUMMARY OF THE INVENTION

The invention has the objective of providing a connection profile on whose receiving profile such Z sheet piles can be hung, to create combination sheet pile walls.

This objective, as well as other objectives which will become apparent from the discussion that follows, are achieved, in accordance with the present invention, by providing a connecting profile having a central rib bar which divides from each other two oppositely placed attachment profiles, each having a jaw. One of the attachment profiles is configured as a mounting profile for the supporting element and the other attachment profile is configured as a receiving profile for a lock of an attaching sheet pile.

The receiving profile according to the invention is common to the three embodiments of connection profiles described herein, and is identically configured with all three connection profiles. These three connection profiles differ only in the configuration of the mounting profile with which the connection profile on the supporting element is to be connected.

Thus, with the first embodiment of the connection profile, the mounting profile for the support element is bordered by an edge of the central rib bar, a first straight jaw bar that comes off one end of the central rib bar at an angle of 90°, and a second jaw bar, bent around in the direction of the first jaw bar, that comes off the other end of the central rib bar. The interior cross section of the mounting profile is somewhat trapezoid-shaped, with the base of the trapezoid being formed by the central rib bar. The one base angle is preferably 90°, while the other base angle is preferably greater than 45°.

In contrast, with the second embodiment of the connection profile, the mounting profile is formed by the central rib bar, a first straight jaw bar that comes off one end of the jaw bar at an angle of 90°, and a second jaw bar that likewise comes off the other end of the central rib bar at an angle of 90°. Using the mounting profile thus configured, it is possible to secure the connection profile to supporting elements on which the attachment section for the connection profile is roughly rectangular in cross section.

With the third embodiment of the connection profile, the mounting profile has a roughly swallowtail-shaped interior cross section, which is bordered by the central rib bar and two mirror-image jaw bars that bend toward each other and extend from the two ends of the central rib bar. Due to the interior swallowtail-shaped cross section, the connection profile can be attached to support elements whose attachment sections have wedge-shaped exterior cross sections, for example lobar elements. Due to the swallowtail-shaped configuration of the interior cross section, it becomes possible that the attachment profile can be secured with the jaw of the receiving profile, either pointing away from the supporting element or turned toward the supporting element on the wedge-shaped attachment section, without having to provide for this connection profiles with differently configured mounting profiles. The two jaw bars preferably run at an inclination angle in a range between about 30 to 50°, related to the flat side of the central rib bar, with 35° being especially preferred for the inclination angle.

The receiving profile that is common to the three embodiments of connection profiles is identically configured with all three connection profiles, and is bordered by the central rib bar, a straight jaw bar that runs off one end of the central rib bar at an angle of 90°, and a fourth jaw bar that runs off the other end of the rib bar initially at an angle of 90° and than bends around in a large arc, with its end pointing to the end of the opposite, third straight jaw bar.

What is attained by the configuration of the receiving profile for the claw and knob section of a sheet pile attachment according to the invention, is that the claw or knob section can be swiveled over a wide range in the receiving profile. Thus with the configuration of the receiving profile for the knob section the swivel angle of a sheet pile inserted ranges from about +23° to −45°, so that the entire swivel angle is about 70°. For the receiving profile for the claw section of a sheet pile attachment, the swivel angle extends from about +27° to −40°, so that the swivel angle likewise is about 70°.

If two Z sheet piles with the connection profile according to the invention are used in a combination sheet pile wall between two adjoining double-T elements, the supporting elements, being double-T elements, for example, can be turned relative to each other at an angle of over 80°, without resulting in stresses within the combination sheet pile wall. If one bears in mind that the swivel angle between two sheet piles connected without an additional connection profile in the middle between two support elements amounts to a few more degrees also, then one sees that an angle of approximately 90° can be attained between two adjoining support elements. In this way, the combination sheet pile wall can be set at a true angle, or a closed combination sheet pile wall can be erected in a circle or similar closed form.

Due to this large swivel angle, when the supporting elements are rammed down, displacements appearing in the sheet pile can be compensated for in all directions.

The receiving profile of the three embodiments of the connection profiles is configured according to the invention so that the individual pieces of the sheet pile wall can be securely rammed down so that deviations of the sheet pile wall from target measurements can be compensated over wide ranges, and within the combination sheet pile wall, between adjoining supporting elements, especially double-T support elements, high swivel angles are possible.

Thus, with a particularly preferred embodiment of the connection profile, the interior cross section of the receiving profile of an attaching sheet pile is essentially a slanting ellipse. What is attained by the at least approximately elliptical-shaped interior cross section of the receiving profile is that the lock within a present swiveling range in the receiving profile can be swiveled back and forth, with the arc-shaped jaw bar preventing the lock from jumping out of the receiving profile. The cross section of the interior space of the receiving profile does not have to have the exact same elliptical shape. The elliptical shape is merely a guide for the dimensions. The longer axis or main axis of the ellipse preferably is at an angle of about 30° to the central rib bar.

If the receiving profile for attachment of a claw section of the sheet pile is to be used, the ratio of the long axis of the ellipse to the short axis or auxiliary axis of the ellipse in this embodiment shape is preferably between 1.1 and 1.2.

If, in contrast, use is made of the receiving profile for hanging a knob section, the receiving profile likewise has a slanting ellipse whose main axis preferably is at an angle of about 30° to the central rib bar.

The ratio between the longer and shorter axis preferably is here in a range between 1.2 and 1.6, however.

The jaw of the receiving profile for the claw section of an attaching sheet pile has its center roughly in the extension of the shorter axis of the ellipse. The center of the jaw opening of the receiving profile for the knob section of an attaching sheet pile lies on an imaginary line running roughly at a right angle to the longer axis of the ellipse, with the imaginary line intersecting the longer axis of the ellipse between the center point of the ellipse and the point of intersection facing the central rib bar between the longer axis with the ellipse. The imaginary line lies roughly in the middle between these two points.

The width of the jaw opening lies in a range roughly of a third of the length of the longer axis of the particular ellipse. The placement of the exits from the interior spaces of the two different ellipses is guided by the position of the curved locking connections of the attaching Z sheet piles.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
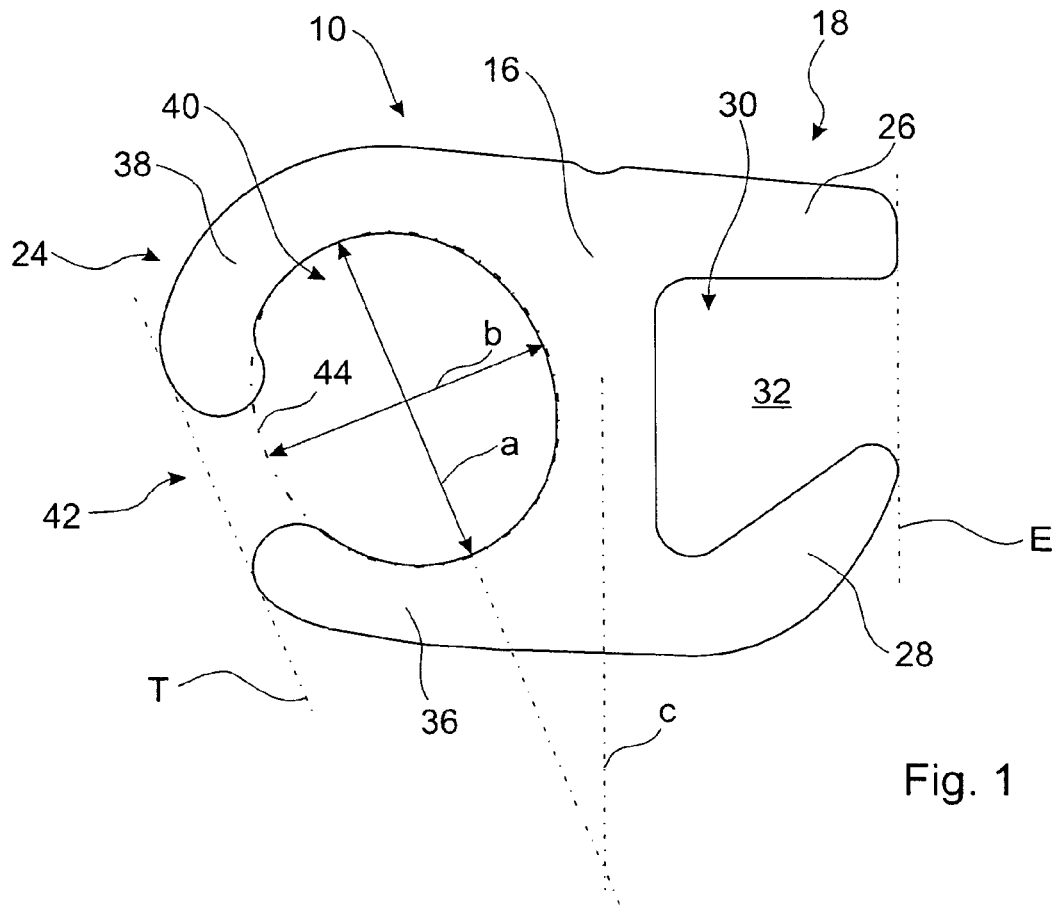
FIG. 1 is a plan view of a first embodiment of an invention-specific connection profile with a mounting profile that is trapezoidal in interior cross section and a receiving profile for a claw section of an attaching Z sheet pile.

The preferred embodiments of the present invention will now be described with reference to FIGS. 1-9 of the drawings. Identical elements in the various figures are designated with the same reference numerals.

Figure 2:
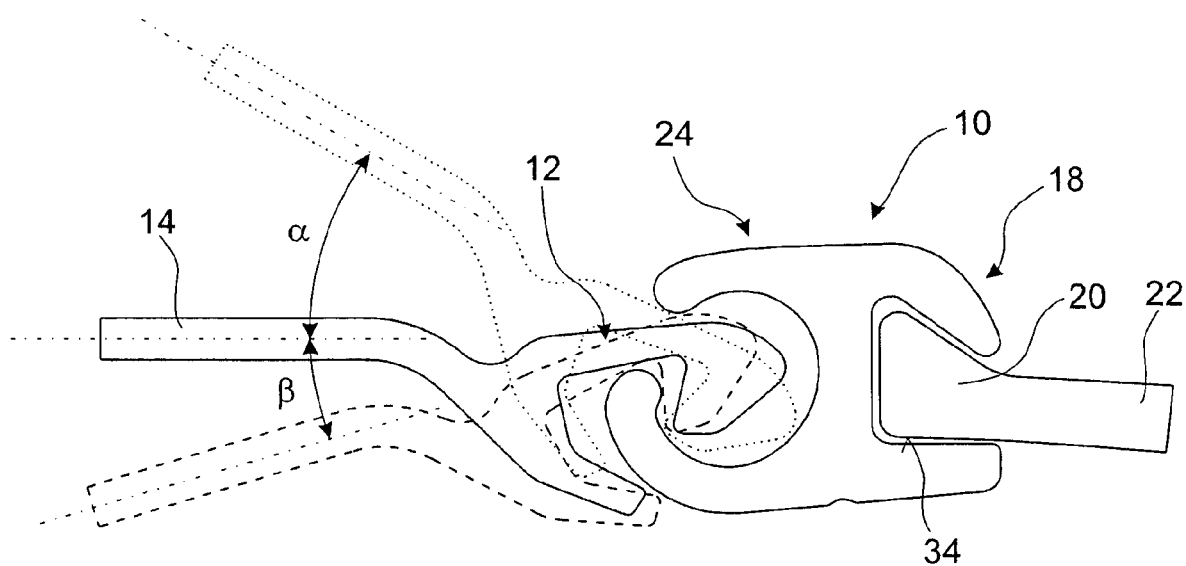
FIG. 2 is a plan view of the connection profile according to FIG. 1, which is placed on a double-T support element and on which a claw section of a Z sheet pile attaching is hung, with the possible swivel angle of the attaching Z sheet pile depicted.

In FIGS. 1 and 2, the front side of an initial embodiment of a connection profile 10 is shown for a claw section 12 of a Z sheet pile 14 (see FIG. 2).

The connection profile 10 has a central, essentially straight rib bar 16, on one side of which a mounting profile is placed for attachment on a knob bar 20 of a double-T support element 22, and on the other side, a receiving profile 24 is placed to admit the claw section 12 of the Z sheet pile 14.

Mounting profile 18 has a first, straight jaw bar 26, which extends out at an angle of 90° from the end of central rib bar 16 shown above in FIG. 1, as well as a second jaw bar 28 that that extends out from the end shown as being below in FIG. 1 and bending around in the direction toward the first jaw bar 26. The two jaw bars 26 and 28 terminate at a plane E running parallel to central rib bar 16, and jointly form with it a jaw 30 with a roughly trapezoidal interior cross section 32. This trapezoidal interior cross section 32 is adapted to the exterior cross section 34 of the knob bar 20 of double T support element 22 so that it can be admitted with little play into mounting profile 18.

Receiving profile 24 has an essentially straight third jaw bar 36 that extends out from central rib bar 16 at an angle of about 90° and connects to bent jaw bar 28, and a fourth jaw bar 38 that attaches to straight jaw bar 26 and bends out in a large arc. Jaw bars 36 and 38, along with central rib bar 16, enclose a jaw 40 with a jaw opening 42 delimited by the ends of jaw bars 36 and 38. The interior cross section of jaw 40 runs roughly along an ellipse 44 depicted by a dash-and-dot line with a longer axis a and a shorter axis b. Larger axis a makes an acute angle of about 30° with a center axis c, drawn with a dash-and-dot line, of central rib bar 16. The axis ratio between the longer and shorter axis a and b is in the range between 11:9 and 11:10. The extension of shorter axis b runs roughly through the center of jaw opening 42. Jaw bars 36 and 38 run so that a tangential plane T touches the two jaw bars 36 and 38 and runs roughly parallel to longer axis a of ellipse 44.

FIG. 2 shows the connection of connecting profile 10 with the arm of double-T support element 22 and claw section 12 of Z sheet pile 14, with Z sheet pile 14 depicted in its middle setting and its extreme swivel settings. The "upper" swivel setting is here depicted in dotted lines, while the "lower" swivel setting is shown by dashed lines. Between the normal setting and the upper swivel setting, a swivel angle á of about 40° can be achieved, and between the normal setting and the lower swivel setting an angle â of about 27° can be attained.

Figure 3:
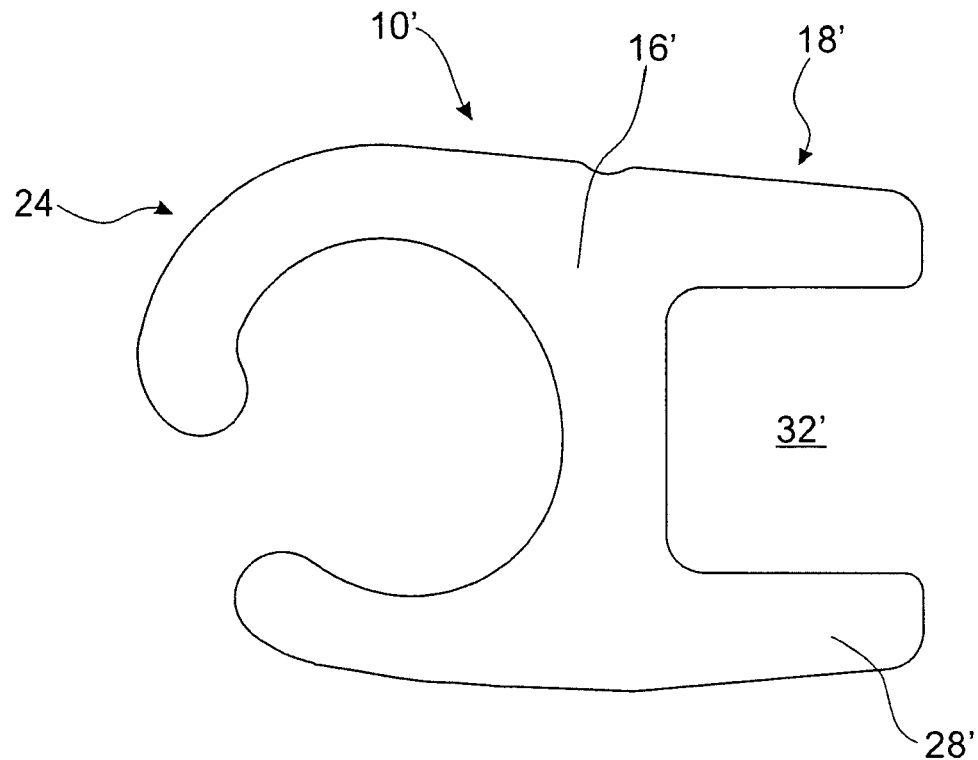
FIG. 3 is a plan view of an initial modification of the attachment profile shown in FIGS. 1 and 2, in which the interior cross section of the mounting profile for the supporting element is rectangular.
Figure 4:
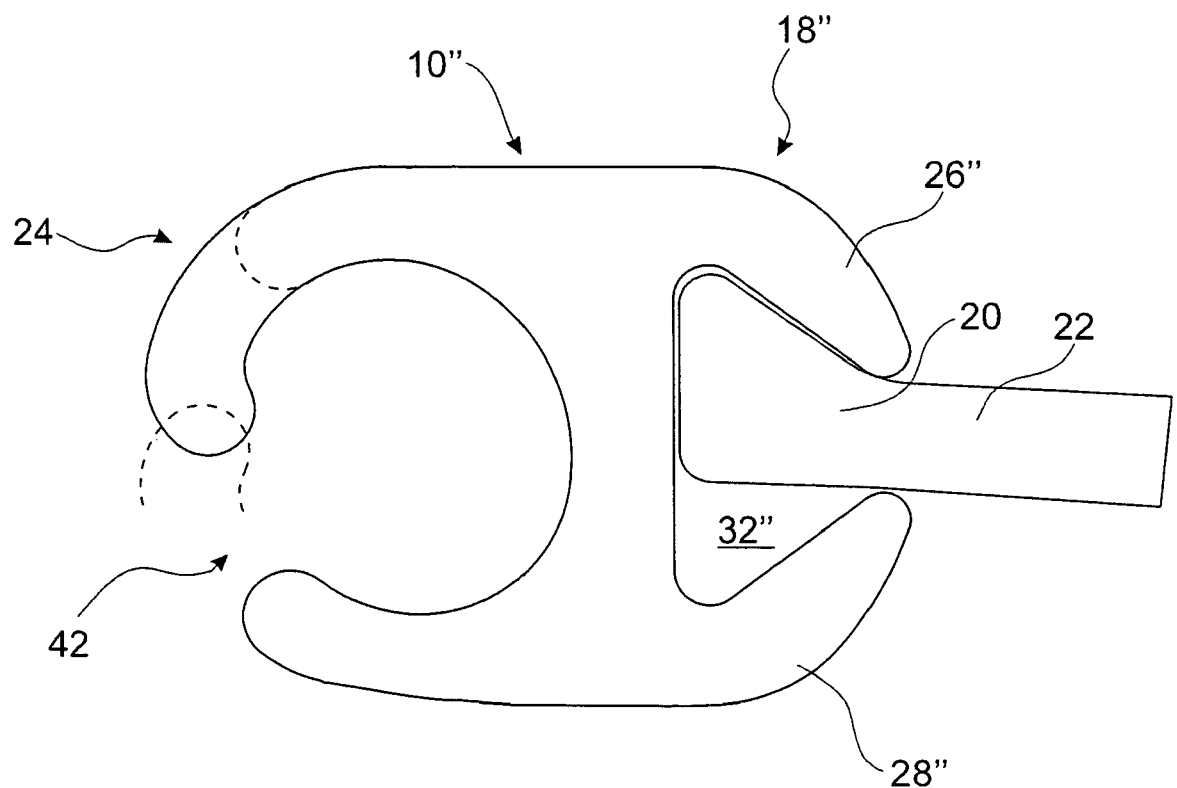
FIG. 4 is a plan view of a second modification of the connection profile shown in FIGS. 1 and 2, in which the interior cross section of the mounting profile for the supporting element has a swallowtail shape.

FIGS. 3 and 4 show modifications of the connection profiles shown in FIGS. 1 and 2.

The modified attachment profile 10' shown in FIG. 3 differs from attachment profile 10 only in regard to the configuration of mounting profile 18'. With this mounting profile 18', the two jaw bars 26' and 28' run at an angle of about 90° relative to the flat side of central rib bar 16', so that a roughly rectangular interior cross section 32' is formed. The mounting profile 18' thus formed can be mounted on a supporting element in which the attachment section is configured to be rectangular in its exterior cross section.

The modified connection profile 10" shown in FIG. 4 also differs from connection profile 10 only in the configuration of mounting profile 18". Here the two jaw bars 26" and 28" each run toward each other at an angle of about 35°, so that mounting profile 18" in its interior cross section 32" is roughly swallowtail-shaped. Owing to the swallowtail-shaped configuration of mounting profile 18", connection profile 10" can be attached to knob bar 20 of double-T support element 22 with the jaw opening 42 of receiving profile 24 facing either inward, or, as indicated by the dashed depiction, outward.

Figure 5:
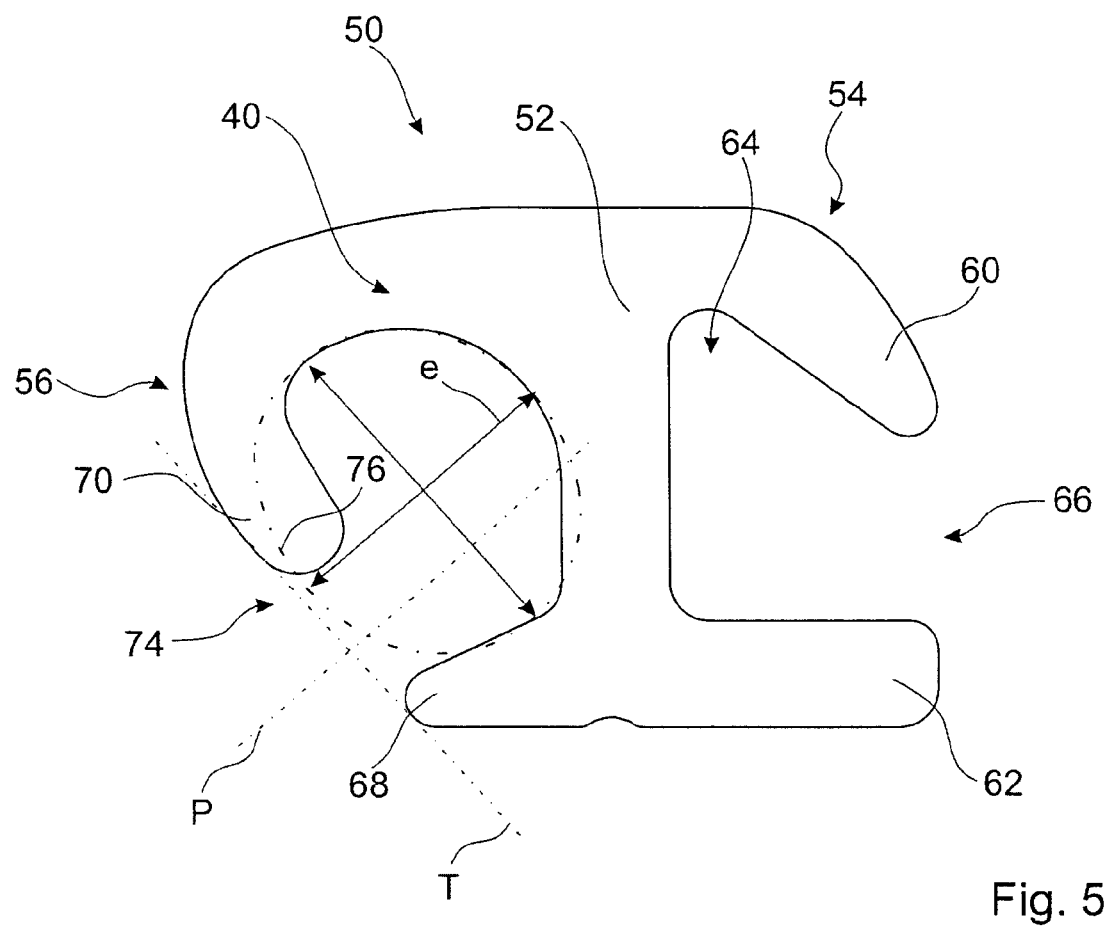
FIG. 5 is a plan view of the second embodiment of an invention-specific connection profile with a mounting profile that is trapezoidal in its interior cross section and a receiving profile for a knob section of a Z sheet pile attaching.
Figure 6:
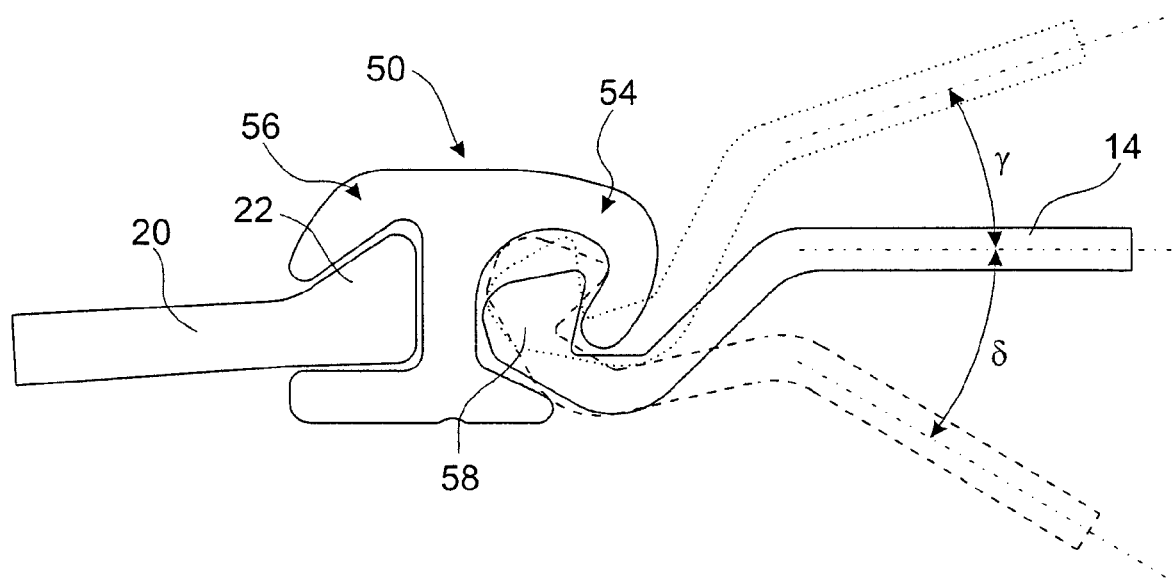
FIG. 6 is a plan view of the connection profile according to FIG. 5, which is mounted on a supporting element and receives a knob section of an attaching Z sheet pile, with the possible swivel angle of the attaching Z sheet pile likewise depicted.

The second embodiment of an invention-specific attachment profile 50 shown in FIGS. 5 and 6 is in essence designed similar to attachment profile 10 and has a central rib bar 52, a mounting profile 54 to admit knob bar 20 of double-T support element 22, as well as a receiving profile 56 for admitting a knob section 58 of Z sheet pile 14 (see FIG. 6). The dimensions of jaw bars 60 and 62 as well as jaw 64 and jaw opening 66 of mounting profile 54 in attachment profile 50 correspond in their configuration to those of attachment profile 10.

On the side of central rib bar 52 that faces away from mounting profile 54, receiving profile 56 is configured for knob section 58 of Z sheet pile 14. Receiving profile 56 is bordered by a straight jaw bar 68 that attaches to jaw bar 60, whose flat side shown at the top in FIG. 5 is bent downwards. Opposite-sided jaw bar 70 initially extends out as a continuation of jaw strip 62 at an angle of about 90° from central rib bar 52 and then makes a rather sharp bow turn, with the end of this jaw bar 70 pointing to the end of straight jaw bar 68.

By this means, a jaw 72 with a jaw opening 74 is delimited by central rib bar 52 and jaw bars 68 and 70. Here also the interior area of jaw 72 can be described as an ellipse 76 with a longer axis d and a shorter axis e. However, the shorter axis e projects into the end area of jaw bar 70 and itself projects slightly into the central rib bar 52. Longer axis d is again inclined relative to central rib bar 52 at an angle between 30° and 40°. Parallel to shorter axis e, there runs a parallel P, which extends between the center point of ellipse 76 and the edge on straight jaw bar 68 through the center of jaw opening 74. The axis ratio between the longer axis d and the shorter axis e is in the area of roughly 4 to 3.

With this receiving profile 56 also, there runs a tangential plane T, which simultaneously touches the two jaw bars 68 and 70, running essentially parallel to longer axis d of ellipse 76.

FIG. 6 depicts a connection of connection profile 50 with the knob bar 20 of double-T support element 22 and the knob section 58 of Z sheet pile 14, again depicting the normal setting and the extreme swivel position "upwards" with the swivel angle ã shown by dots and the "downwards" swivel position at the swivel angle ä indicated by dashes. The extreme swivel angle ã is about 23° while the extreme swivel angle ä is about 45°.

Figure 7:
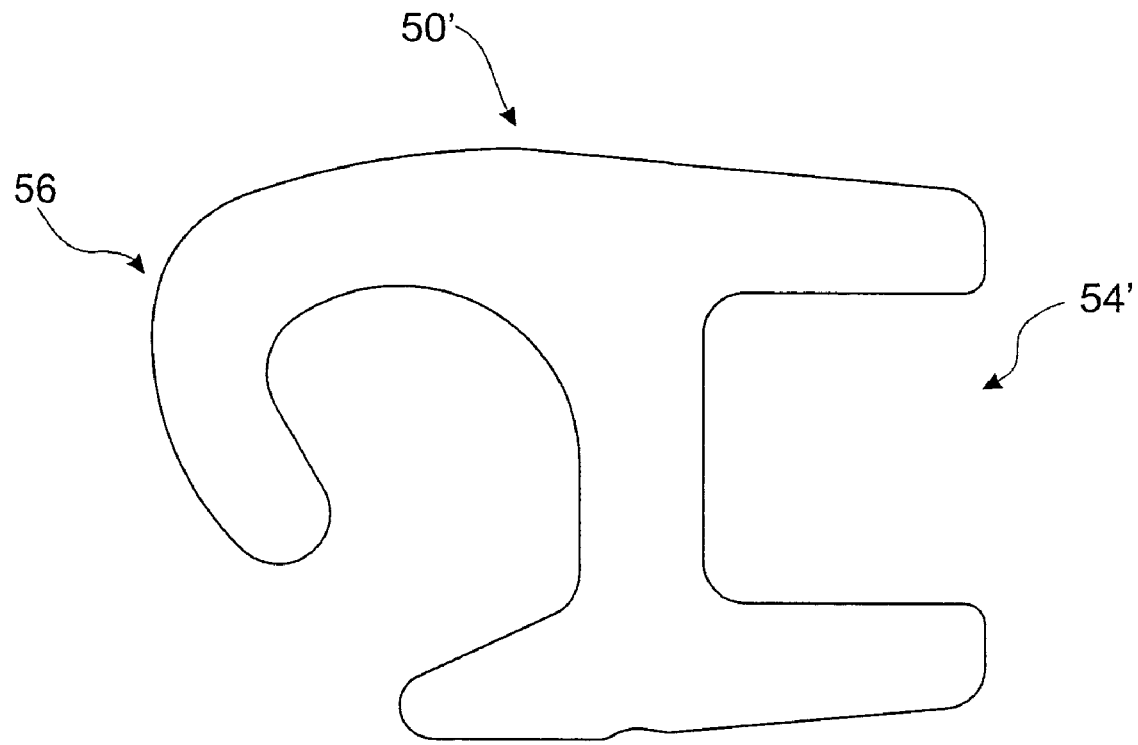
FIG. 7 is a plan view of a first modification of the connection profile shown in FIGS. 5 and 6, in which the interior cross section of the mounting profile for the supporting element is rectangular.
Figure 8:
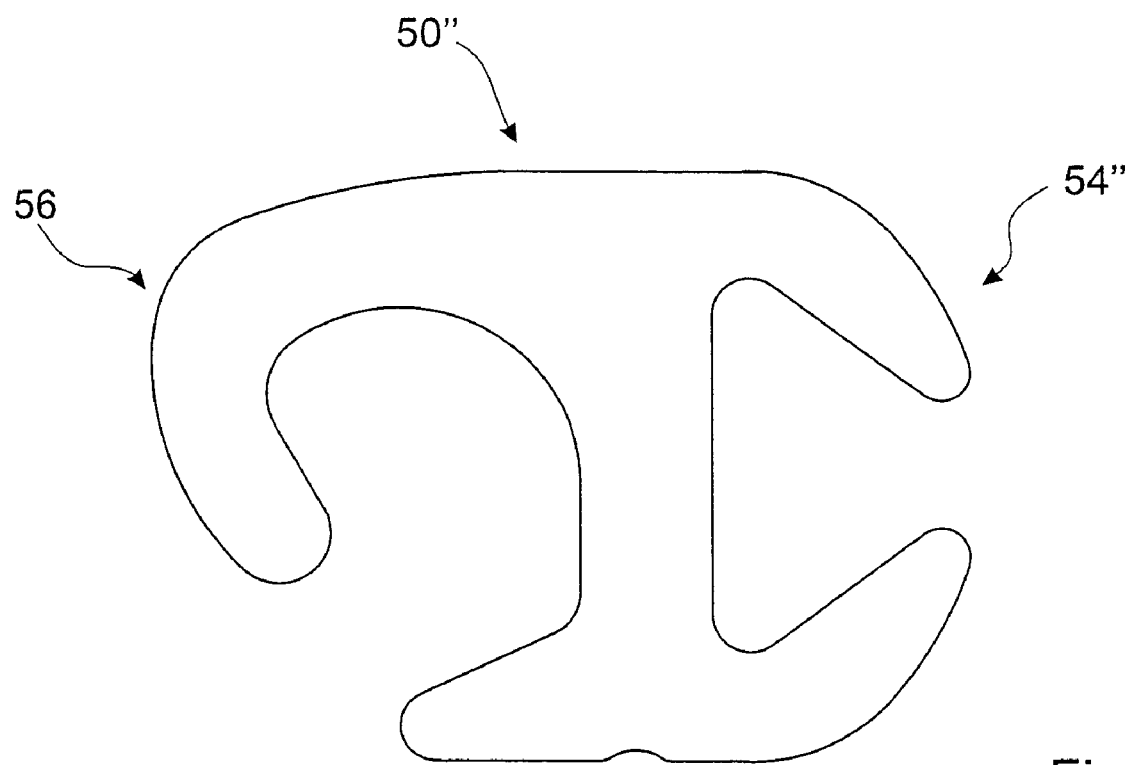
FIG. 8 a plan view of a second modification of the connection profile shown in FIGS. 5 and 6, in which the interior cross section of the mounting profile for the supporting element is swallowtail-shaped.

FIGS. 7 and 8 show two modifications of connection profile 50. In these two modified connection profiles 50' and 50", the mounting profiles 54' and 54" are configured to match mounting profiles 18' and 18" of the two modified attachment profiles 10' and 10". Receiving profile 56 of the two modifications 50' and 50" matches receiving profile 56 of connection profile 50.

Figure 9:
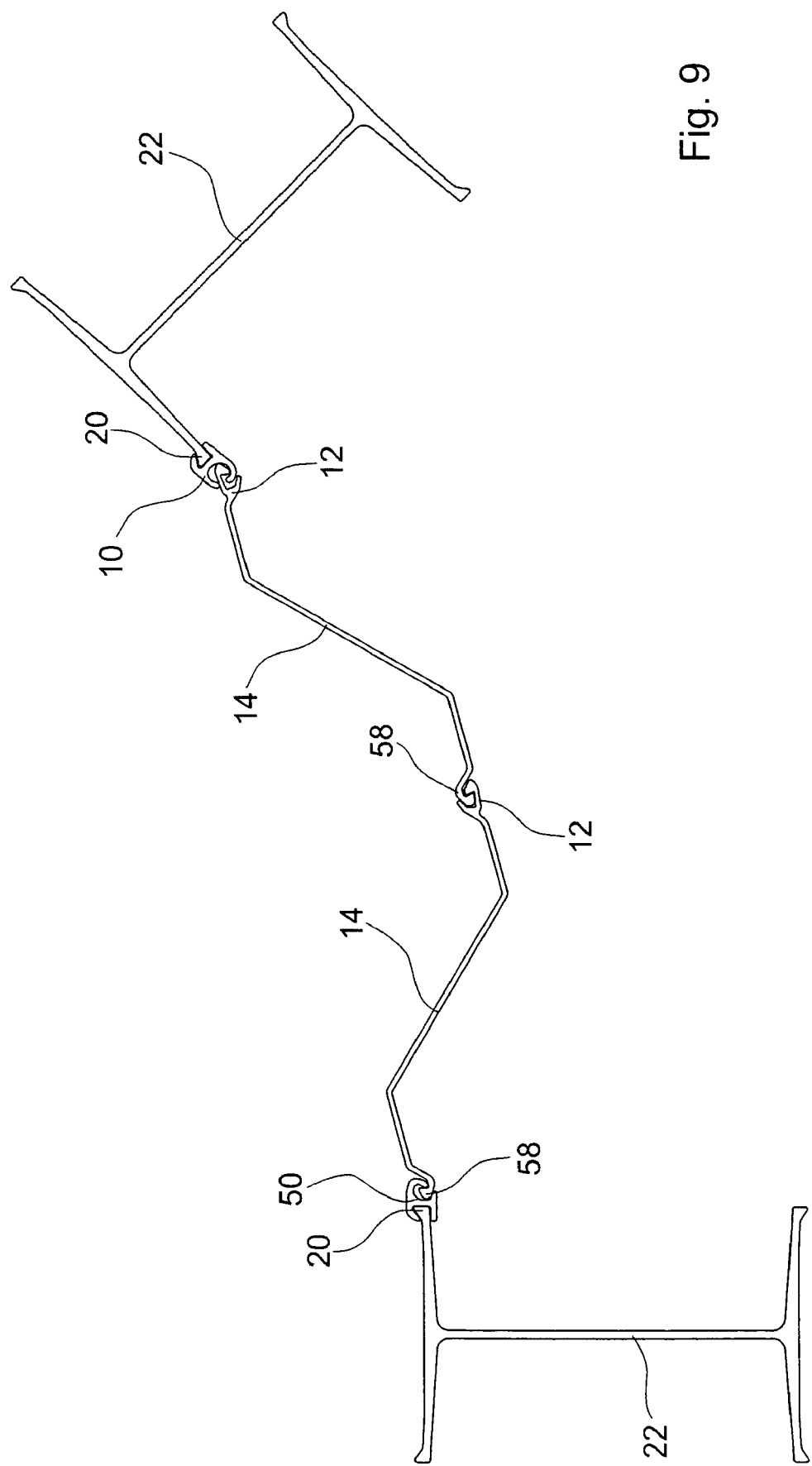
FIG. 9 is a plan view of a piece of a combination sheet piling wall with two supporting elements and two sheet piles inserted between them, with the two connection profiles shown in FIGS. 1 and 5 being used.

FIG. 9 shows part of a combination sheet pile wall 80 with two adjoining double-T support elements 22 and two Z sheet piles 14 situated between them. On one arm with the knob bar 20 of the first double-T support element 22 shown at left in FIG. 9, connection profile 50 is mounted, in which a knob section 58 of the first Z sheet pile 14 is admitted. The double-T support element 22 depicted at right in FIG. 9 is turned relative to the first double-T support element 22 at an angle of about 60°, and on the arm facing the first double-T support element 22 is provided with connecting profile 10, in which claw section 12 of the second Z sheet pile 14 is admitted. In the middle between the double-T support elements 22, two Z sheet piles 14 are hooked together in the customary manner, with knob section 58 of the right Z sheet pile 14 in FIG. 9 engaging into claw section 12 of Z sheet pile 14 depicted at left in FIG. 9.

If the above-mentioned extreme swivel angles between the Z sheet piles 14 and connection profiles 10 and 50 are employed, and likewise the admittedly small swivel angles of about +/−7° between the knob section 58 and the claw section 12 that engages it of Z sheet pile 14, then the angle between the two double-T support elements 22 can be up to 85°.

This can be employed not merely to create closed or curved combination sheet pile walls, or ones provided with an acute angle. Even when, during downward ramming of individual double-T support elements 22, the distances between adjoining double-T support elements 22 vary, or the double-T support elements 22 are twisted relative to each other, such displacements can be compensated for through the configuration of connection profiles 10 and 50.

There has thus been shown and described a novel continuous connecting profile for attachment of sheet piles to supporting elements which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. In a continuous connecting profile for attachment of sheet piles to supporting elements for assembly of a combination sheet pile wall made of supporting elements and sheet piles inserted between every two supporting elements, wherein the connecting profile has a central rib bar, which divides from each other two oppositely placed attachment profiles each having a jaw, and is a part of both attachment profiles, and wherein one of the attachment profiles is configured as a mounting profile for the supporting element and the other attachment profile is configured as a receiving profile for a lock of an attaching sheet pile, the improvement wherein the mounting profile is delimited by a flat section of the central rib bar, a first jaw bar that extends out from one end of central rib bar and a second jaw bar that extends out from the other end of central rib bar, and wherein the receiving profile is delimited by a curved section of the central rib bar, a third, straight jaw bar that extends out from one end of central rib bar at an angle of 90°, and a fourth jaw bar that extends out from the other end of rib bar, initially at an angle of 90° and then turning in an arc, the end of which points to the end of the oppositely positioned third, straight jaw bar.

2. Connecting profile according to claim 1, wherein the first jaw bar is substantially straight and extends out from one end of the central rib bar at an angle of 90°, and the second jaw bar is substantially straight and extends out from the other end of central rib bar at an angle of 90°.

3. Connecting profile according to claim 2, wherein the interior cross section of receiving profile essentially forms an ellipse with a longer axis and a shorter axis.

4. Connecting profile according to claim 3, wherein the longer axis of ellipse makes an angle with the center axis of central rib bar of between 25° and 40°, and especially of about 30°.

5. Attachment profile according to claim 3, which serves for attachment of a claw section of sheet pile, and that the ratio between the longer axis and the smaller axis of ellipse is in the range between 11:9 and 11:10.

6. Connecting profile according to claim 3, wherein the receiving profile serves for attachment of a knob section of sheet pile, and the ratio of the longer axis to the smaller axis of ellipse is approximately in the area of 4:3.

7. Connecting profile according claim 2, wherein the jaw bars of the receiving profile delimit a jaw with a jaw opening and have a tangential plane touching the end of jaw bars that runs parallel to the longer axis of ellipse.

8. Connecting profile according to claim 7, wherein a central line runs through the jaw opening of the receiving profile roughly at a right angle to the longer axis of ellipse.

9. Connecting profile according to claim 8, wherein the center line through the jaw opening is the extension of the shorter axis of ellipse.

10. Connecting profile according to claim 1, wherein the mounting profile has a roughly swallowtail-shaped interior cross section, which is delimited by the central rib bar, as well as by two mirror-image symmetrical bent jaw bars that extend toward each other from the two ends of the central rib bar.

11. Connecting profile according to claim 10, wherein the interior cross section of receiving profile essentially forms an ellipse with a longer axis and a shorter axis.

12. Connecting profile according to claim 11, wherein the longer axis of ellipse makes an angle with the center axis of central rib bar of between 25° and 40° and especially of about 30°.

13. Attachment profile according to claim 11, which serves for attachment of a claw section of sheet pile, and that the ratio between the longer axis and the smaller axis of ellipse is in the range between 11:9 and 11:10.

14. Connecting profile according to claim 11, wherein the receiving profile serves for attachment of a knob section of sheet pile, and the ratio of the longer axis to the smaller axis of ellipse is approximately in the area of 4:3.

15. Connecting profile according claim 10, wherein the jaw bars of receiving profile delimit a jaw with a jaw opening and have a tangential plane touching the end of jaw bars that runs parallel to the longer axis of ellipse.

16. Connecting profile according to claim 15, wherein a central line runs through jaw opening of receiving profile roughly at a right angle to the longer axis of ellipse.

17. Connecting profile according to claim 16, wherein the center line through jaw opening is the extension of the shorter axis of ellipse.

18. Connecting profile according to claim 1, wherein the interior cross section of receiving profile forms an approximate ellipse with a longer axis and a shorter axis.

19. Connecting profile according to claim 18, wherein the longer axis of ellipse makes an angle with the center axis of central rib bar of between 25° and 40°.

20. Attachment profile according to claim 18, which serves for attachment of a claw section of sheet pile, and that the ratio between the longer axis and the smaller axis of the ellipse is in the range between 11:9 and 11:10.

21. Connecting profile according to claim 18, wherein the receiving profile serves for attachment of a knob section of sheet pile, and the ratio of the longer axis to the smaller axis of the ellipse is approximately 4:3.

22. Connecting profile according to claim 18, wherein the jaw bars of the receiving profile delimit a jaw with a jaw opening and have a tangential plane touching the end of jaw bars that runs parallel to the longer axis of the ellipse.

23. Connecting profile according to claim 22, wherein a central line runs through the jaw opening of the receiving profile roughly at a right angle to the longer axis of the ellipse.

24. Connecting profile according to claim 23, wherein the center line through the jaw opening is the extension of the shorter axis of the ellipse.

25. Connecting profile according to claim 1, wherein the first jaw bar is straight and extends out from one end of central rib bar at an angle of 90°, and the second jaw bar extends out from the other end of central rib bar bending around in the direction of the first, straight jaw bar.

26. Connecting profile according to claim 25, wherein the interior cross section of receiving profile forms an approximate ellipse with a longer axis and a shorter axis.

27. Connecting profile according to claim 26, wherein the longer axis of the ellipse makes an angle with the center axis of central rib bar of between 25° and 40°.

28. Connecting profile according to claim 26, which serves for attachment of a claw section of sheet pile, and that the ratio between the longer axis and the smaller axis of the ellipse is in the range between 11:9 and 11:10.

29. Connecting profile according to claim 26, wherein the receiving profile serves for attachment of a knob section of sheet pile, and the ratio of the longer axis to the smaller axis of the ellipse is approximately 4:3.

30. Connecting profile according claim 26, wherein the jaw bars of receiving profile delimit a jaw with a jaw opening and have a tangential plane touching the end of jaw bars that runs parallel to the longer axis of the ellipse.

31. Connecting profile according to claim 30, wherein a central line runs through jaw opening of receiving profile roughly at a right angle to the longer axis of the ellipse.

32. Connecting profile according to claim 31, wherein the center line through jaw opening is the extension of the shorter axis of the ellipse.

* * * * *